(12) United States Patent
Vincent, III

(10) Patent No.: US 7,366,729 B2
(45) Date of Patent: Apr. 29, 2008

(54) SCHEMA FRAMEWORK AND A METHOD AND APPARATUS FOR NORMALIZING SCHEMA

(75) Inventor: Winchel Todd Vincent, III, Lexington, KY (US)

(73) Assignee: WTVIII, Inc., Atlanta, GA (US)

( * ) Notice: Subject to any disclaimer, the term of this patent is extended or adjusted under 35 U.S.C. 154(b) by 0 days.

(21) Appl. No.: 10/865,519

(22) Filed: Jun. 10, 2004

(65) Prior Publication Data

US 2004/0254953 A1 Dec. 16, 2004

Related U.S. Application Data

(60) Provisional application No. 60/477,530, filed on Jun. 11, 2003.

(51) Int. Cl.
*G06F 7/00* (2006.01)
(52) U.S. Cl. .................... 707/101; 707/103 R
(58) Field of Classification Search ........... 707/100, 707/205, 200, 10, 102, 103 X, 103 Y, 103 Z, 707/103 R, 101; 715/513
See application file for complete search history.

(56) References Cited

U.S. PATENT DOCUMENTS

| | | | |
|---|---|---|---|
| 5,627,979 A | 5/1997 | Chang et al. | |
| 6,119,126 A | 9/2000 | Yee et al. | |
| 6,163,776 A | 12/2000 | Periwal | |
| 6,189,000 B1 * | 2/2001 | Gwertzman et al. | 707/1 |
| 6,199,059 B1 | 3/2001 | Dahan et al. | |
| 6,353,830 B1 | 3/2002 | Yee et al. | |
| 6,418,448 B1 * | 7/2002 | Sarkar | 707/104.1 |
| 6,460,043 B1 | 10/2002 | Tabbara et al. | |
| 6,721,747 B2 * | 4/2004 | Lipkin | 707/10 |
| 6,768,986 B2 | 7/2004 | Cras et al. | |
| 6,816,864 B2 * | 11/2004 | Deuser et al. | 707/100 |
| 6,816,865 B2 | 11/2004 | O'Brien et al. | |
| 6,829,606 B2 | 12/2004 | Ripley | |
| 6,865,576 B1 | 3/2005 | Gong et al. | |
| 6,871,198 B2 | 3/2005 | Neal et al. | |
| 6,904,432 B2 | 6/2005 | Charlot et al. | |

(Continued)

OTHER PUBLICATIONS

Glace, Jessica L. and Crawford, Mark R., Recommended XML Namespace for Government Organizations, Logistics Management Institute, GS301L1, Mar. 2003.

(Continued)

*Primary Examiner*—Greta Robinson
(74) *Attorney, Agent, or Firm*—Gardner Groff Greenwald & Villanueva, PC

(57) ABSTRACT

The schema framework of the present invention is a set of rules and best practices that a user follows when creating schema in accordance with the present invention. By following these rules, schema are produced that can be used, reused, and managed in a distributed computing environment, thus reducing the time and effort associated with creating instance documents. Certain rules govern the content and format of the schema namespaces. Each schema namespace includes a category identifier that identifies a category to which the schema associated with the namespace relates. Once an instance document has been published by storing it in a schema repository, the schema and the namespace associated with that schema are "frozen" and cannot be changed. By freezing the schema and namespace, the schema and namespace become standardized, which facilitates instance document generation, validation, and use across a distributed system.

14 Claims, 7 Drawing Sheets

U.S. PATENT DOCUMENTS

| | | | |
|---|---|---|---|
| 7,007,033 B1* | 2/2006 | Rothschiller et al. | 707/101 |
| 2002/0099735 A1 | 7/2002 | Schroeder et al. | |
| 2002/0129060 A1 | 9/2002 | Rollins et al. | |
| 2002/0143785 A1 | 10/2002 | Pugh | |
| 2003/0023604 A1 | 1/2003 | O'Brien et al. | |
| 2003/0101190 A1* | 5/2003 | Horvitz et al. | 707/100 |
| 2003/0115548 A1 | 6/2003 | Melgar | |
| 2003/0121005 A1 | 6/2003 | Herbst et al. | |
| 2003/0163479 A1 | 8/2003 | Mathews et al. | |
| 2003/0204511 A1* | 10/2003 | Brundage et al. | 707/100 |
| 2004/0059744 A1 | 3/2004 | Duncan et al. | |
| 2004/0064825 A1 | 4/2004 | Lim et al. | |
| 2004/0098667 A1 | 5/2004 | Atkinson | |
| 2004/0122844 A1 | 6/2004 | Malloy et al. | |
| 2004/0194057 A1* | 9/2004 | Schulte et al. | 717/114 |
| 2004/0205563 A1 | 10/2004 | Lee | |
| 2004/0205573 A1 | 10/2004 | Carlson et al. | |
| 2006/0101333 A1* | 5/2006 | Collie et al. | 715/513 |

OTHER PUBLICATIONS

Roy et al., XML Schema Language: Taking XML to the Next Level, IT Professional vol. 3, Issue 2, Mar.-Apr. 2001, pp. 37-40.

Park et al., XML Rule Based Source Code Generator for UML Case Tool, Software Engineering Conference, 2001. APSEC 2001. Eighth Asia-Pacific, Dec. 4-7, 2001, pp. 53-60.

Bayle et al., Knowledge-Based System for Relational Normalization of GDBMS Conceptual Schemas, Artificial Intelligence Applications, 1998, Proceedings of the Fourth Conference on Mar. 14-18, 1998 pp. 159-165.

* cited by examiner

SCHEMA FRAMEWORK AND A METHOD AND APPARATUS FOR NORMALIZING SCHEMA

CROSS REFERENCE TO RELATED APPLICATION

This application claims priority to U.S. Provisional Patent Application Ser. No. 60/477,530, filed Jun. 11, 2003, which is hereby incorporated herein by reference in its entirety for all purposes.

FIELD OF THE INVENTION

The present invention relates generally to mark up language schema, and more particularly, to a schema framework and a method and apparatus for normalizing schema to ensure that they conform to the framework.

BACKGROUND OF THE INVENTION

Extensible Markup Language (XML) is specification developed by the World Wide Web Consortium ("WC3"). XML has become increasingly more important in the exchange of data and documents ("XML documents") on the Web and elsewhere. XML allows designers to create their own data and document formats ("formats"). XML formats are customized tags, enabling the definition, transmission, validation, and interpretation of data between applications and between organizations. Schemas define XML formats. The W3C, OASIS, and other organizations have published specifications for creating schemas (e.g., the W3C's XML DTDs and XML Schema, and OASIS' Relax NG). There is, however, no specification that describes how designers can manage schemas on a large scale and within a standard schema framework.

Therefore, there exists in the industry a need for a system that facilitates the ongoing and consistent creation, management, and use of multiple schemas and versions of schemas over time. Further needs exist for a set of best practices and methodology for developing XML schemas that provide version control, unique schema identifiers, schema management and maintenance over time, and consistent publishing rules for schema discovery and documentation.

SUMMARY OF THE INVENTION

The schema framework of the present invention is a set of rules and best practices that a user follows when creating schema in accordance with the present invention. By following these rules, schema are produced that can be used, reused, and managed in a distributed computing environment, thus reducing the time and effort associated with creating and using schema and instance documents based on the schema. Certain rules govern the content and format of the schema namespaces. Each schema namespace includes a category identifier that identifies a category to which the schema associated with the namespace relates. Once an instance document based on the schema has been published in a schema repository, the schema and the namespace associated with that schema are "frozen" and cannot be changed. By freezing the schema and namespace, the schema and namespace become standardized, which facilitates instance document generation, validation, and use across a distributed system.

In addition, the namespace category identifier makes it possible to group schema in the repository by subject matter, which allows schema to be more easily searched, retrieved and managed from distributed schema repositories. This also facilitates instance document generation across a distributed system. Each namespace includes a category identifier that identifies a subject matter, such as, for example, a geographical region identifier, a legal jurisdiction identifier, a person, an address, a document type, a form type, and an organization identifier. The geographical identifier may identify a geographical or other location or a place. The organization identifier may identify a social or commercial organization, an institution, a department, an agency, an industry, etc. Preferably, a category identifier has a subject matter meaning that is commonly understood by humans so that understanding the category identifier is easy and so that reuse and management of schema is encouraged.

These and other features and advantages of the present invention will become apparent from the following description, drawings and claims.

DETAILED DESCRIPTION OF THE PREFERRED EMBODIMENTS

Figure 1:
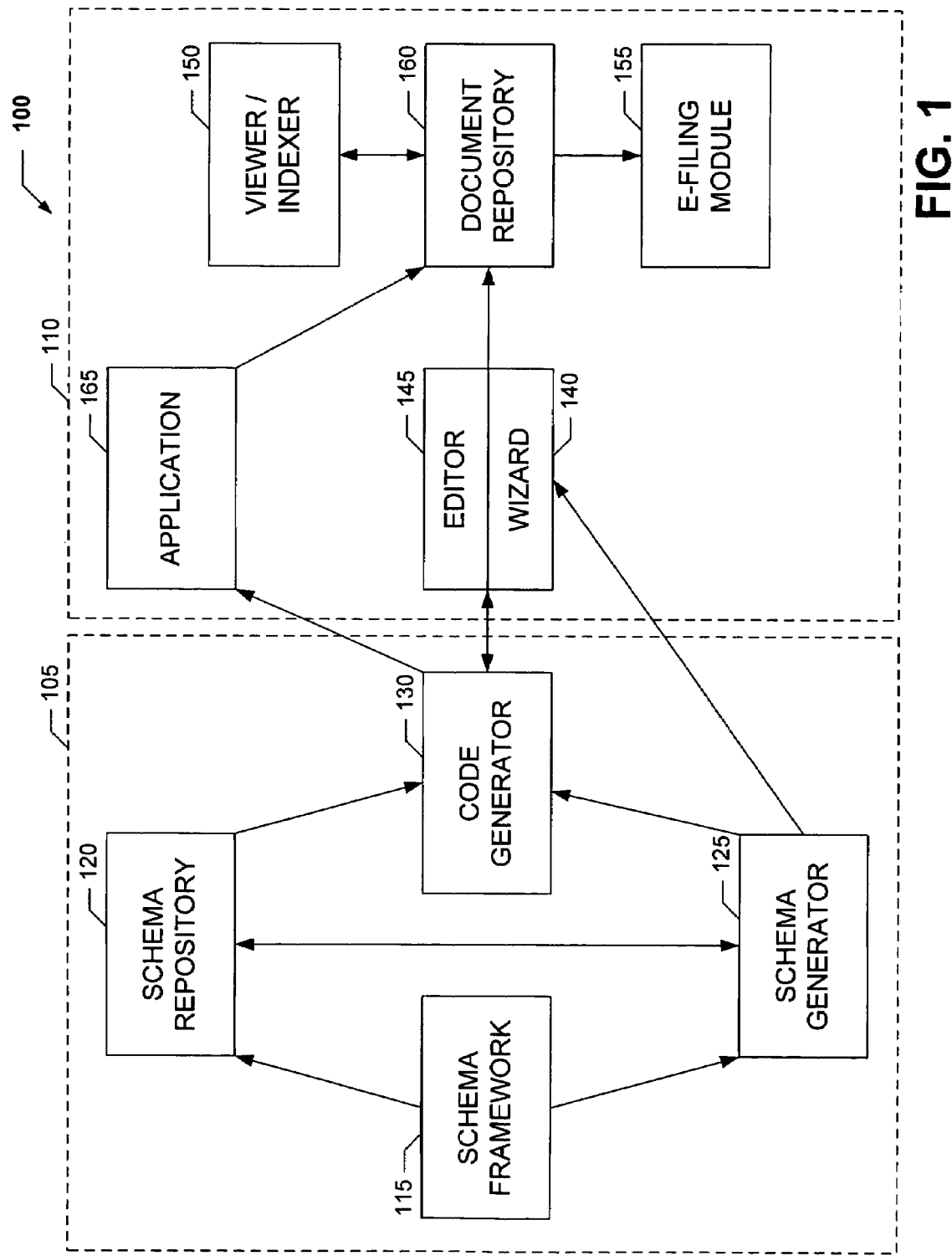
FIG. 1 is a block diagram representation of a system for developing and managing schema and XML documents in accordance with an exemplary embodiment of the present invention.

Referring now to the drawing figures, in which like reference numbers refer to like parts throughout the several views, preferred forms of the present invention will now be described by way of example embodiments. It is to be understood that the embodiments described and depicted herein are only selected examples of the many and various forms that the present invention may take, and that these examples are not intended to be exhaustive or limiting of the claimed invention. Also, as used in the specification including the appended claims, the singular forms "a," "an," and "the" include the plural unless the context clearly dictates otherwise.

FIG. 1 depicts a block diagram of a system 100 for developing and managing schema and using the schema to author and manage content in accordance with an exemplary embodiment of the present invention. Preferably, the system 100 comprises a schema development and management subsystem 105 and a content authoring, management and electronic filing subsystem 110.

The schema development and management subsystem 105 comprises a schema framework 115 that describes rules that govern the operation of a schema repository 120, a schema generator 125, and a code generator 130. The schema repository 120 and the schema generator 125 communicate between each other and with the code generator 130. Schema output from the schema development and management subsystem 105 are used as input for the content authoring, management, and electronic filing subsystem 110. Additionally, schema output from the schema development and management subsystem can be recycled for reuse in the schema development and management subsystem. As an example, schema output from the schema generator 125 can be used as input for the code generator 130. The code generator, in turn, communicates with the content authoring, management, and electronic filing subsystem 110.

The content authoring, management, and electronic filing subsystem 110 comprises a wizard 140 for editing forms, an editor 145 for editing documents, a viewer and indexer 150, an electronic filing module 155, and a document repository 160. The content authoring, management, and electronic filing subsystem 110 can also comprise external application software 165.

The Schema Framework

Figure 2:
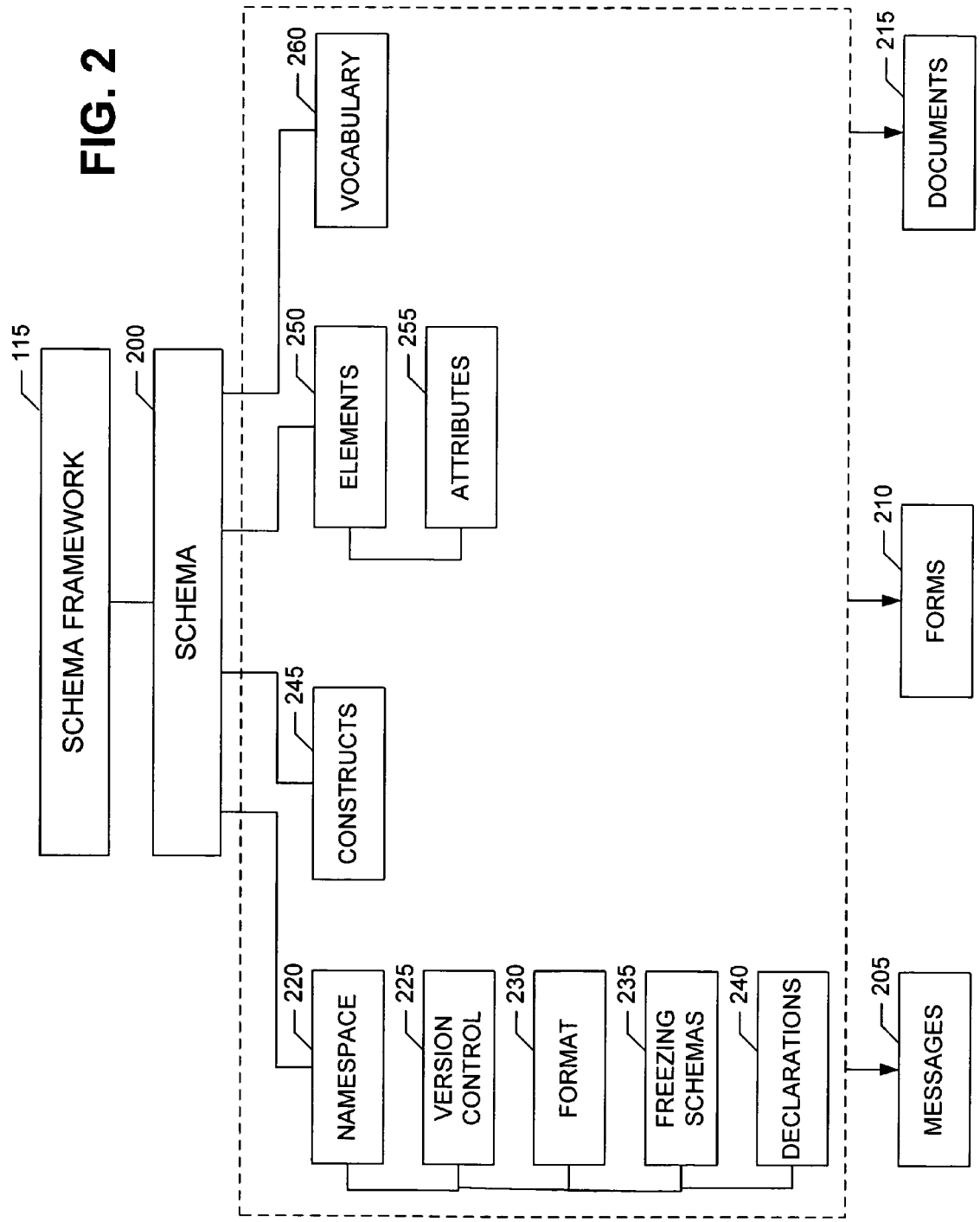
FIG. 2 is a block diagram representation of a schema framework of FIG. 1.

The schema framework 115 provides a set of rules, or best practices, for developing schemas 200 that can be used to create messages 205, forms 210, and documents 215, as depicted in FIG. 2. Preferably, the schemas use the W3C XML Schema 1.0 as a basis for creating the schema framework 115. However, other types or versions of schemas could be used, such as a future version of W3C XML Schema or OASIS' RELAX NG Schema.

Namespaces

Preferably, the schemas use namespaces 220 to distinguish the context of XML elements that have the same name but that have different meanings. An XML namespace is generally defined as a collection of names, identified by a URI reference, that are used in XML documents as element types and attribute names. More preferably, the schemas 200 generated through the schema framework 115 use meaningful namespaces 220 and meaningful namespace prefixes as a form of version control. Preferably, the namespaces 220 are meaningful in that they convey to the user of the system 100 a description of the XML elements and thus provide an automated way of discovering schema in Internet-based or local schema repositories.

Namespaces 220 are declared in an XML document either as a target namespace, in which case the namespace prefix is not used, or as a non-target namespace, in which case the namespace prefix is used. Preferably, a "xsd:targetNamespace" is declared with a value equal to the default namespace value.

The schema framework 115 distinguishes between two types of instance documents: (a) complex XML documents and (b) simple XML documents. In a complex XML instance document, the namespace prefix prefixes all elements in the document, except that the root element may be unprefixed. That is, the prefix is separated from the element name by a colon. In Simple XML instance documents, a default namespace without a prefix is used on each module's intended root element, in which case the default context of its descendants are implied.

In an instance document, the namespace prefix precedes the element name separated by a colon or the namespace is declared on a parent element in which case the default context of its descendents are implied. For example, the following are preferred namespaces.

xmlns: Furniture="http://www.xmllegal.org/Schema/xmlLegal/Furniture/01 xmlns: Document="http://www.xmllegal.org/Schema/xmlLegal/Document/01

Thus, in these two examples, the namespace prefixes are "Furniture" and "Document". It should be understood that the prefix is not the actual namespace, but rather, the prefix is a mapping to it.

For example, the following attribute maps the "Address" prefix to a namespace (that happens to be a uniform resource identifier "URI"):

xmlns:Add ress="http://www.XMLlegal.org/Schema/Building Blocks/Primitives/Add ress/01/"

In the next example, the prefix is the same, but the namespace is different:

xmlns:Address="http://www.XMLlegal.org/Schema/Building Blocks/Primitives/Add ress/02/"

The result is an element <Address:Line> in Instance Document One where the first namespace is used that has a different technical value than the same <Address:Line> element in Instance Document Two where the second namespace is used. Thus, the two elements are different, even though textually they appear the same (in instance documents, e.g., <Address:Line> in a Complex XML document or <Line> in the "Address" context in a Simple XML document).

Thus, unlike other namespace regimes, the schema framework 115 standardizes meaningful namespace prefixes. This provides a type of human-readable categorization system for schemas. For example, the "Address" prefix is used for a category of schemas that represent addresses, although each address schema may be slightly different and may be assigned a different namespace and a correspondingly difference place in a schema repository 120.

Thus, it can be said that a "genre" of schemas is "Address" but there may be different types of addresses within the genre. In this way, the specific "meaning" of a particular XML instance document can be tied to the schema located at a repository location with the same namespace. If the schema 200 is frozen, then this in turn "freezes" the meaning of the schema and all document instances associated with it. This provides a great deal of flexibility in creating related schemas for similar but different applications, while providing both a technical and human-readable means of understanding instance documents and mapping like-schema to like-schema and like-meaning to like-meaning.

In exemplary embodiments, the prefix "Address" is a standard prefix for addresses. There can be multiple namespaces associated with a single prefix, which can distinguish meaning and provide version control. Preferably, all addresses, for example, use the "Address" prefix.

It should be noted that the list of standard prefixes, including but not limited to, Phone, Email, Person, and Organization can expand. Thus, the schema framework 115 is designed to accommodate expansion and evolution over time and to do so such that "meaning" can be fixed and discovered in a mechanical way.

It should also be noted that multiple schema types can exist in the same XML document (e.g., multiple Address formats used in the same document). If two address formats exist in the same document, then meaningful prefixes can preferably be used that establish the distinction (e.g., ShortAddress and LongAddress). Additionally, the schema framework 115 can accommodate foreign language formats, which use a different prefix that corresponds to the English word in the foreign language (e.g., "Addresse" would be used for a German address).

Namespaces for Version Control

In the preferred embodiment, the schemas 200 generated through the schema framework 115 use meaningful namespaces 220 and meaningful namespace prefixes as a form of version control 225. Version control 225 is important because in the software and technical standards industries, most products have multiple versions that are incremented over time. It is useful to version XML schemas as well for at least three reasons: (1) in cases where an existing schema may be updated or replaced by a new schema; (2) in cases where there may be a need for two similar schemas to meet different requirements; and (3) in cases where there are language differences such as foreign languages or even differences in the English language (e.g., organization versus organisation).

Thus, version control 225 can be achieved with the use of unique namespaces 220. Namespaces are preferably URIs (i.e., uniform resource indicators) that point to a location at the schema repository 120. Local and mirrored repositories can also be used, provided those repositories preferably follow the schema framework 115 rules for local and mirrored repositories.

In a preferred embodiment, the namespace 220 is unique; the schemas 200 are frozen upon publication of the first instance document; and the schema 200 can be programmatically discovered in the schema repository 120 (or in the local or mirrored repository) based on the namespace string.

Format of a Namespace

Namespaces 220 in the format 230 of a URI are preferably made of four parts, although other organization is possible. In the preferred embodiment, the first part includes the string to a domain name, such as for example, "http://www.xml-legal.org/". The second part includes the string "Schema/". The third part is a logically-ordered string of meaningful subject matter, including jurisdictional, organizational, or geographical names, preferably separated by a forward or backslash, depending on the nature of the directory. The fourth part is a numeral to indicate version. In some cases, the numeral to indicate version will sometimes precede the name of the schema as a grouping mechanism. The numeral to indicate version may be omitted in cases, such as for example, where a primary schema imports secondary schemas and the primary schema uses a numeral for version control. In such a case, the secondary schemas can be located in subdirectories of the primary schema and are, therefore, clearly versioned from others of like kind. In the preferred embodiment, the numeral indicating version can be in any one of the following formats, where X is a digit 0 to 9: XX; XXX; TestXX; or TestXXX, although other formats are possible. The numeral at the end of the namespace allows different versions of the same type of schema to be adopted in the same geographical location, organization, or jurisdictions.

Preferably, namespaces 220 and associated directory structures use full-spelled, Upper Camel Case words, except for widely understood abbreviations or acronyms (such as country codes), with no spaces, although namespaces 220 and directory structures can be created using abbreviated or truncated names or acronyms and be within the scope of the present invention. The use of full-spelled Upper Camel Case words makes namespaces and directory structures human-readable and aesthetically pleasing and also provides the ability to more efficiently do mechanical human-language dictionary analysis and aggregation and comparison of human-language synonyms.

In the preferred embodiment, the schema repository 120 uses a descriptive label, such as one describing a general subject matter or organizational label, following the Part II "Schema/" string. Such labels include, for example, "Court", "Transcripts", "Justice", "Healthcare", "Automotive", "Banking" or an organizational name, such as "xmlLegal", "Microsoft", or "DepartmentOfPublicSafety." In the preferred embodiment, either before or following the subject matter or organizational label, a two-letter ISO 3166 country code optionally can be used. For example, "US" would be used for United States, or "AU" for Australia. Additionally, in the preferred embodiment, after the county code, the fully spelled state or province can be used. Optionally, a two-letter abbreviation for the state or province can be used. After the state or province name, a narrower geographic or jurisdictional subdivision, such as the county name, can be used. Different or additional subdivisions can be used to further refine the applicability of the schema and be within the scope of the present invention.

Freezing a Schema in a Namespace

Instance documents can use namespaces 220 for version control 225 because the schema (or schemas) corresponding to the instance document can be "frozen" once a document instance has been published.

Stated another way, "freezing a namespace" or describing a schema as "frozen" means that the schema located in one or more repositories and identified by a unique identifier such as a unique namespace may no longer be changed. Thus, preferably, a new schema or version of a schema of a similar type uses a different unique identifier and can be located in a correspondingly different place in one or more mirrored schema repositories. For example, a schema can be copied into another namespace and the new schema in the new namespace can be altered. However, once frozen, the original schema preferably cannot be changed. If the schema were to be changed after it was "frozen", then the instance documents based on the changed schema potentially will not validate against the original schema, which means that applications cannot rely on either schema and the system may not function properly.

Preferably, the schemas 200 are frozen once instance documents based on those schemas are published to the schema repository 120 because once an instance document is published and available to the world, the namespace in it will point back to the location in one or more schema repositories where the schema on which it is based is located. If the schema is changed at the position in the directory where the namespace points, then the instance documents based on the schema are not likely to validate against it, thus potentially causing interoperability problems that may cause the system to not function properly.

To overcome these shortcomings, a new version of the same schema can be created and stored in a directory corresponding to a similar, but new namespace. In this way, the integrity of published instance documents is maintained indefinitely, while allowing new versions to be developed.

Namespace Declarations and Import Statements

In the preferred embodiment, namespaces are declared as attributes of the xsd:schema element using a standard namespace prefix appropriate to the schema. The namespace prefix represents the genre of schemas being created, such as, but not limited to, an Address, Phone, Email, Person, Organization, Weapon, Vehicle,=, Account, or Patient. New namespace prefixes are added as desired and are preferably descriptive of the schema genre being described. Also preferably, the schemas can import an Attributes schema, which is a set of global attributes.

In the preferred embodiment, the namespace value is declared as an attribute in the xsd:schema element that matches the namespace declared in the xsd:import element. The schema location attribute on the xsd:import element is preferably a relative path (rather than a hard coded path) to a location in the schema repository directory structure beginning with the directory "Schema."

Conventions

For organizational purposes, the schema framework 115 preferably orders schema constructs 245 as follows: complextypes; simpleTypes; elements; and groups, although other ordering schemes are also within the scope of the present invention. The order of complexTypes and elements are preferably in the order the element first appears in the schema, even if the element is only referenced. Regardless of how complexTypes are ordered, in the preferred embodiment, the first complexType in the schema preferably has an attribute name value that is the same as the schema's namespace prefix, filename, and parent or grandparent directory, as described below, although other naming conventions are also within the scope of the present invention.

The first complexType in the schema preferably corresponds to the element intended to be the "root" element of the schema. The root element, the genre of the namespace prefix, the name of the schema filename in the schema repository, and the name of the schema's parent directory or grandparent directory if a version number directory is used, are preferably the same string.

The value of the "name" attribute on all complextypes is preferably the exact string as the corresponding element declaration. All complexTypes preferably use the Attributes:Global attributeGroup. ComplexTypes may contain element references to internal, globally declared elements or to imported elements, but preferably do not include locally declared, non-unique elements. For example, if the element names are not unique within the context of the namespace (which can happen with locally declared elements), then the system may not work properly. ComplexTypes are preferably declared globally, not locally to an element. SimpleTypes are preferably declared globally within the schema or imported from another schema.

Element and Attributes

XML information often sits just below the user interface. If named and structured such that the names convey the content of the elements, the names for elements 250 and attributes 255 can be taken directly from XML and used as labels in the user interface. For example, by searching the string "CaseName" for an uppercase character preceded by a lowercase character, it is very easy to add a space that results in a readable and aesthetically pleasing user interface. This can be done with elements that use underscores for spaces and for Lower Camel Case. If, however, abbreviations are used as element names, then the use of them as labels, without additional translation encoding, can often be difficult or confusing.

Thus, preferably, the element names have formats using uppercase letters for the first letter of each word (Upper Camel Case), although other element naming conventions are also within the scope of the present invention. One or all words in the element name can be programmatically or otherwise capitalized, which ultimately provides a visually pleasing user interface. For example, the following are preferred formats for element names: CourtFiling, FirstName, LastName, and City. Also preferably, the element names use no abbreviations. If, however, common abbreviations are used, then the abbreviations are preferably documented and listed in the schema's specification with the non-abbreviated form clearly documented.

In the preferred embodiment, elements 250 are preferably declared globally, not locally, as elements with no children elements except for elements used for documentation. (In the preferred embodiment, child elements can occur when using xsd:annotation or xsd:appinfo). Thus, all global elements are preferably unique to the schema and, hence, to the namespace, and therefore every element in the schema repository preferably has a unique and distinct meaning. Elements 250 preferably use the "type" attribute. The value of the element's type attribute can be either the name of a complexType declared in the schema, or the name of a complexType declared in an imported schema. All elements 250 preferably use, at least, the Attribute:Global group of attributes. The global attributes are preferably declared in the element's corresponding complexType declaration. Elements used as children of other elements are referenced in the intended parent's complexType.

Attributes 255 are preferably declared in an element's corresponding complexType as a local attribute. Also preferably, attributes 255 are not declared globally and referenced. Any number of attributeGroup elements may be referenced. Attributes that are a simpleType preferably use the type attribute, consistent with the rule that simpleTypes are preferably declared globally.

The Attributes:Global group preferably includes at least the following attributes: ID (xsd:ID); Class (xsd:string); and Type (xsd:string), although other or additional attributes are also within the scope of the present invention.

Although it is possible to use minOccurs and maxOccurs in a variety of ways, the schema preferably do not use minOccurs and maxOccurs attributes on content model declarations for choice, sequence, or all, although other conventions are also within the scope of the present invention. The schema also preferably do not use "nested" content models within a schema. The group element may use minOccurs and maxOccurs. It is possible to "nest" content models by either importing the intended root element of a schema or by referencing a group.

Normalization

Schemas can follow certain rules of construction. Schemas following the rules of constructions are called "normalized" schemas, and the process of creating or ensuring that a schema is normalized is called "normalization."

Schema "normalization" is an algorithm that represents a set of best practices and conventions used in the schema framework 115. In the preferred embodiment, the algorithm functions such that an input schema is transformed into another representation and then transformed from that new representation into schema. The resulting schema should be a valid schema, should follow the rules of the schema framework, and should validate the same instance documents as the original schema. Schema normalization is done in the schema framework 115 so that one structure is used consistently in a number of schemas rather than several structures used inconsistently in different schemas. That is, preferably, an Address schema that is normalized uses the same schema constructs and conventions as a Person schema. Normalization makes it much easier for developers to understand and develop code for schemas and instance documents based on schemas, to manage schemas, as well as to develop new schemas.

Modularity

The schema framework 115 preferably uses modular XML schemas as building blocks to build other, more complex schemas, messages, protocols, forms, and documents. XML schemas 200 and XML namespaces 220 provide an easier technical means of creating "modular" schemas as compared to creating one large schema to describe an XML format. Modularity in XML schemas allows certain parts of the schema 200 to be used in other schema definitions and applications. Reuse of a schema module allows developers to build objects around schema modules and reuse code. Reuse of code speeds development and encourages standardization.

Thus, preferably, the schemas in the schema framework 115 are modular. For example, a schema describing a Person may include import Address, Phone, and Email schemas. A schema describing a Vehicle may include a RegisteredOwner that may be a Person or an Organization. In each case, each schema preferably is a separate schema module. Complex schemas may have several modules.

The namespace prefix plus the name of the element, read together, should have a human-language meaning appropriate to the genre of the schema. For example, if the schema genre (e.g., namespace prefix) is "Person", then the following prefix/element name combinations are preferable for the "Person" schema: Person: Name; Person: FirstName; Person: LastName; and Person: Address.

In the preferred embodiment, the root element of a schema may be imported and used in another schema in one of two ways: use in element declaration type attribute or use in element reference name attribute. Also preferably, only the "intended root element" of a schema or groups within a schema may be imported into another schema. That is, the entire "noun" or "object" is preferably used in the case of a root element or specified groups of elements. Other conventions are also within the scope of the present invention Construction Preferably, the schema framework 115 distinguishes the following: individual elements; base primitives; two-level primitives; multi-level primitives; protocols; messages; forms; and documents. An individual element is an XML element. An XML element can have a tag name such as "City." An example of an XML element is <City>Sydney</City>.

A base primitive is an XML schema module that logically groups a number of elements. For example, an Address is a base primitive that may include the elements "Line," "City," "State," "PostalCode," and "Country." In a preferred embodiment, per the normalization rules above, all schemas import an Attributes.xsd that includes global attributes. Thus, in a preferred embodiment, a Base Primitive, by definition, imports only an Attributes.xsd, but does not import any other schema.

A two-level primitive is a primitive constructed from more than one base primitive. For example, a "Person" may be constructed using the schema modules "Address", "Phone", and "Email." Multi-level primitives (schema) are schema constructed from several base, two-level, or other multi-level primitives. For example, a "Vehicle" may include a registered owner that would be a "Person" or an "Organization." The Person and Organization schemas are themselves two-level primitives; and therefore, Vehicle becomes a multi-level schema. These naming conventions are not necessary for the proper functioning of the schema framework, but serve to define a vocabulary that allows users to meaningfully describe interrelated sets of schema.

Messages 205 and protocols are constructed from elements and base, two-level, and multi-level primitives. There is a fine line between a protocol and a message. Indeed, the line may be so blurred that there is little distinction. In its purest form, a message is a transfer of data from one information system to another information system. A protocol is a message or a series of messages that invokes a subsequent response (e.g., an acknowledgement) or some other workflow. In practice, most messages require some sort of response, so a message is usually part of a protocol and could be considered one and the same.

Like messages, forms 210 are constructed from elements and base, two-level, and multi-level primitives. A form is preferably combined with a stylesheet so that it is easy for a human to read. "Forms" are distinguished from "documents" by the lack of free-form prose. Forms 210 consist of data elements and corresponding labels arranged in a logical and aesthetically pleasing document. Forms 210 may have "memo" fields for long answers to specific questions, but do not generally include long free-form prose, although other hybrid form-documents are also within the scope of the present invention. In the schema framework 115, additional rules can be specified for forms. For example, the schema framework 115 can use the following conventions to create special formats for forms 210:

The root element of a form is "[General Descriptive Word]".

The first child of the root element is <Head>.

The second child of the root element is <Body>.

An optional third child of the root element is <Signature>.

In this example, <Head> is invisible metadata, <Body> is visible information on a form, and <Signature> is information for a digital signature.

In the preferred embodiment, the root element can optionally be created by a "container" schema located within the namespace of the schema that is the first child of the body of the form. For example:

http://www.xmllegal.org/Schema/Court/US/Georgia/Douglas/Juvenile/Form90/01/ http://www.xmllegal.org/Schema/Court/US/Georgia/Douglas/Juvenile/Form90/01/Legal/

The head element preferably includes metadata about the form 210 that would not typically be included in the styled representation of the form (i.e., it would not appear on the face of the form for the human reader). The head element preferably includes, but is not limited to, the following schemas: DocumentSummary; DocumentStatistics; DocumentVersion; DocumentProperties; and DocumentWorkflow. Other means of incorporating form metadata are also within the scope of the present invention. Preferably, the head element for all forms 210 is common or, at least, very similar. The stylesheet for the form 210 can be included within the form or can be a reference to a separate file. The body element's first, and preferably only, child includes the unique schema that make up the form.

Documents 215 are constructed from elements and base, two-level, and multi-level primitives. Like forms, a document 215 can be combined with a stylesheet so that it is easy for a human to read. Like forms, a document 215 can include a head, a body, and an optional signature. Unlike forms, documents 215 include free-form prose (or "unstructured text") that requires special document-specific primitives. In the schema framework 115, the head, body, and signature elements can operate in the same way for both forms and documents. The body of a document, however, differs from the body of a form.

The body of an document preferably includes (1) frontmatter; (2) a body, or body elements, that include as descendants paragraphs, headings, outlines and optionally tables and objects (graphics, pictures, controls), and (3) backmatter. Paragraphs, headings, outlines, and tables include within them "flattened" inline vocabulary.

Frontmatter and backmatter usually include information that is structured like a form. For instance, a court document usually has a caption with the name of the court, the names of the parties, a civil action number, and a title. Likewise, a contract usually has a title, date, names of parties, and recitals. For each type of document, the information in the frontmatter and backmatter is preferably different, but all documents preferably have both frontmatter and backmatter, even if there is no content in the frontmatter or backmatter. Further, depending on the style and preferences of the author of the document, normal frontmatter information may appear in backmatter or visa versa. For instance, the dates and parties in a contract are interchangeably included either at the front of the document or at the back, depending on the preferences of the author of the document.

In between frontmatter and backmatter is preferably the body of the document 215. The body of the document can be prose and can include a mixture of arbitrarily ordered headings, outlines (sometimes called lists), tables, and paragraphs as desired by the author. The body may also include graphics, pictures, and other objects (such, for example, as ActiveX controls).

In addition to the head and body, forms 210 and documents 215 may optionally include an XML signature. An XML signature is information about a digital signature and should be distinguished from a "signature block." A signature block is viewable signature information that is usually included in backmatter. A signature block may include the names of parties, titles, a typewritten signature (e.g., /Signature/) or a graphical signature (e.g., a bitmapped signature).

Vocabulary

Sprinkled randomly throughout the paragraphs, tables, and outlines in the document body is vocabulary 260. For instance, in a contract, there are names, price terms, conditions, and consideration. In transcripts there are questions, answers, witnesses, and exhibits. Different types of documents 220 have different types of vocabularies 260. Not all vocabularies are available to all types of documents. Vocabularies 260 are, therefore, modular based on individual schema.

In determining whether an element 250 is suitable as vocabulary 260, the schema framework 115 can distinguish between types of elements, including structural, data, and hybrid. A structural element is one that represents the structure of a document, such a frontmatter, body, backmatter, paragraph, heading, outline, or table. A data element is one that has some meaning to the human reader, such as, but not limited to, Name, Address, Time, Vehicle, and Consideration. Hybrid elements are elements that serve a structural purpose and are also data. For example, the title in a document is structural in that it conventionally comes at the top of the document, somewhere in frontmatter. Title is also data, in that a title of a book could be extracted and taken out of its structural context and still have meaning. Data elements and hybrid elements are preferably appropriate as vocabulary. Also preferably, pure structural elements are not appropriate as vocabulary. It should be noted that even data elements have structure when represented as XML. For example, an Address has within it (as children) address lines, city, state, postal code, and others.

Vocabulary 260 appears in the text portion of paragraphs, headings, outlines, and tables. The text element in each of these structures is preferably "mixed" content, meaning that text can be arbitrarily sprinkled with elements within the text element. A vocabulary group can be created in individual schemas. Each vocabulary group can be imported into a vocabulary schema. A vocabulary group in the vocabulary schema can be imported into an inline schema. The inline schema can create various groups of vocabulary and other elements that are imported into the text element of paragraph, outline, heading, and table.

The creation of a vocabulary group in individual schemas can provide a "flatting" of any structure used by data elements. Structure is preserved in the data elements that have content models, but by referencing children, the children are made available through the vocabulary group for inserting into the text. In the preferred embodiment, these elements are called "inserted vocabulary elements" ("IVE").

Vocabulary 260 is preferably collected by importing and referencing one or more groups in a vocabulary schema. The vocabulary group can then be imported into the inline schema. The inline schema preferably includes other elements that are common to all documents.

The inline group can then be imported into each of the text elements of paragraph, heading, outline, and table. A simple reference to Inline:Inline makes available all of the vocabulary elements from all of the schema that are imported in the first step, which provides the ability to create either a very specific vocabulary for a specific document type or a very extensive vocabulary for a more general or complex document type.

Schema Maintenance, Discovery, and Documentation

The schemas can be maintained over time and published so that interested parties are able to discover schemas electronically. Preferably, the schemas are also documented. Preferably, the system 100 automatically maintains, discovers, and documents XML schema, in both a machine and human-readable format by publishing schema, documentation, data dictionaries, and indexed lists of schema in the schema repository. For example, a SchemaDescriptions.xsd file can be created such that it uses the namespace prefix "lml" (for "Legal Markup Language").

The Schema Repository

Figure 3:
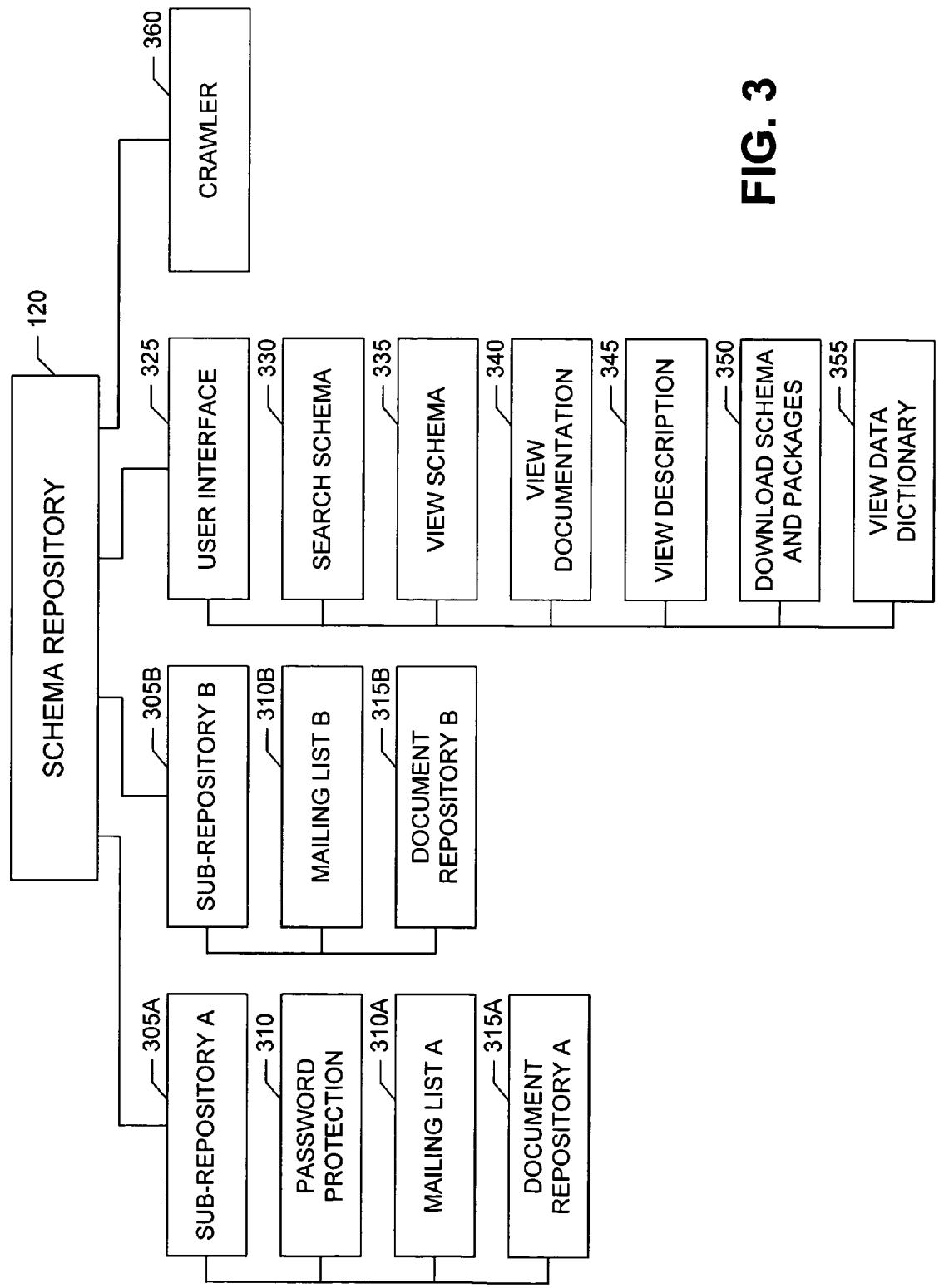
FIG. 3 is a block diagram representation of a schema repository of FIG. 1.
Figure 4:
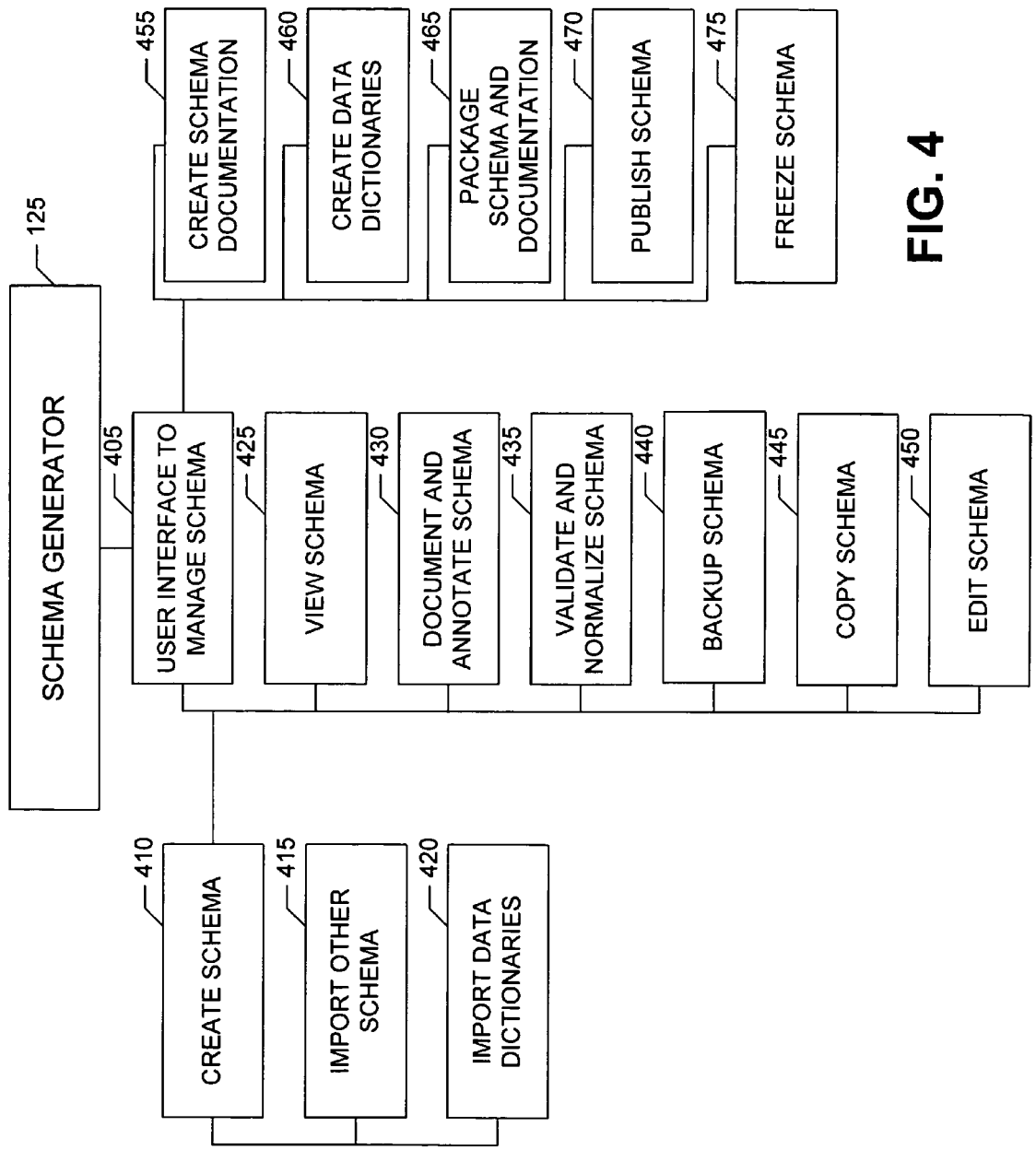
FIG. 4 is a block diagram representation of a schema generator of FIG. 1.
Figure 5:
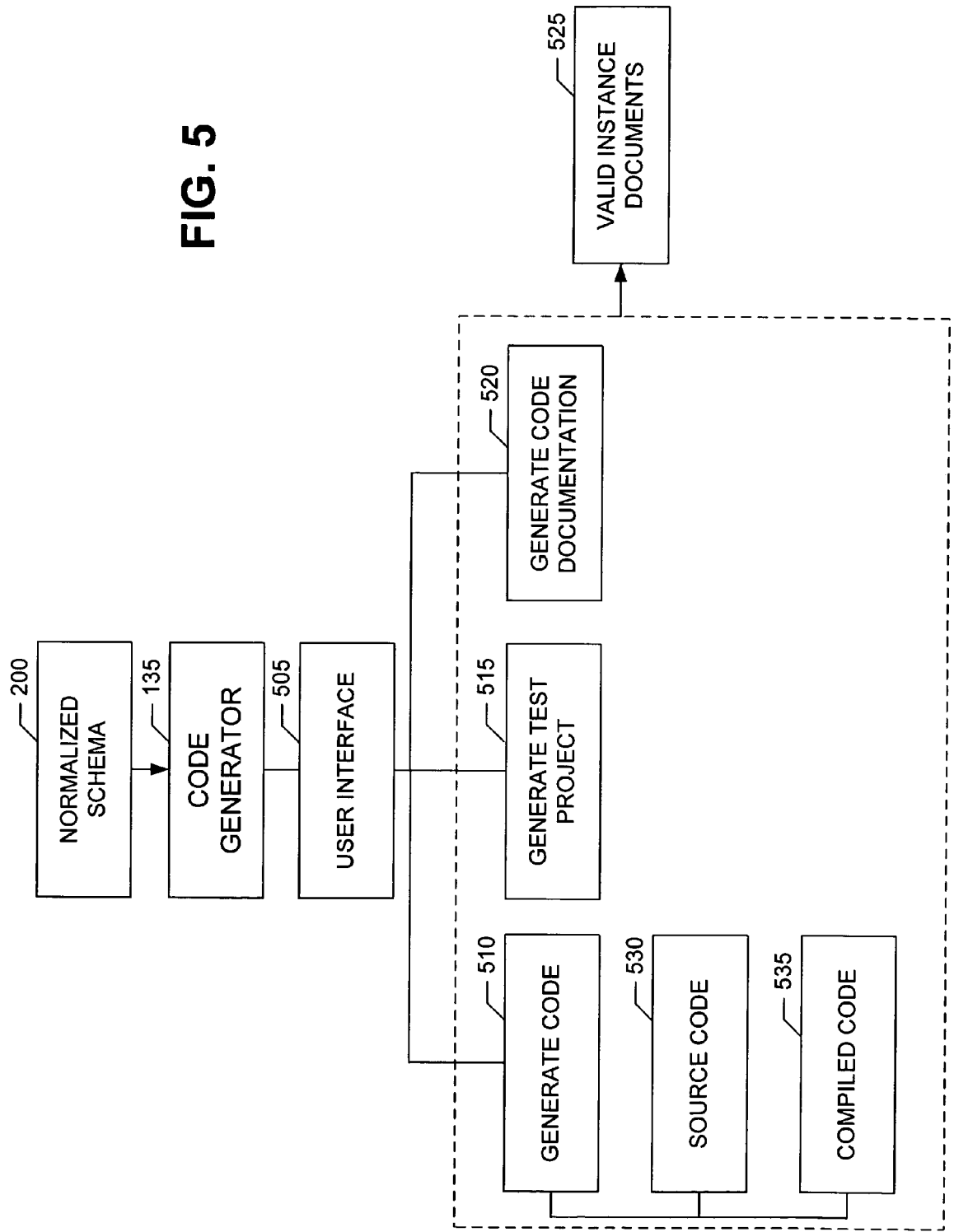
FIG. 5 is a block diagram representation of a code generator of FIG. 1.
Figure 6:
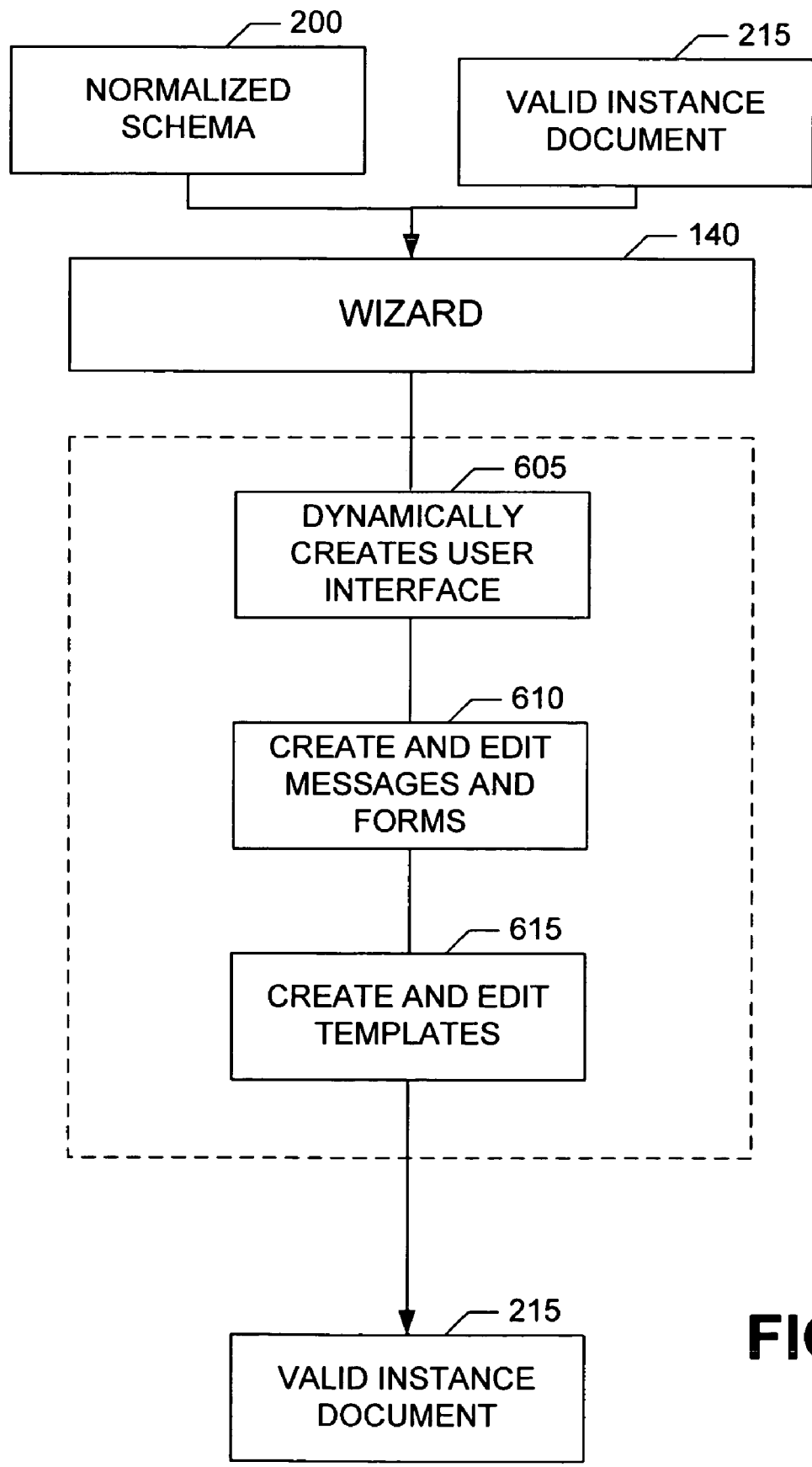
FIG. 6 is a block diagram representation of a wizard of FIG. 1.
Figure 7:
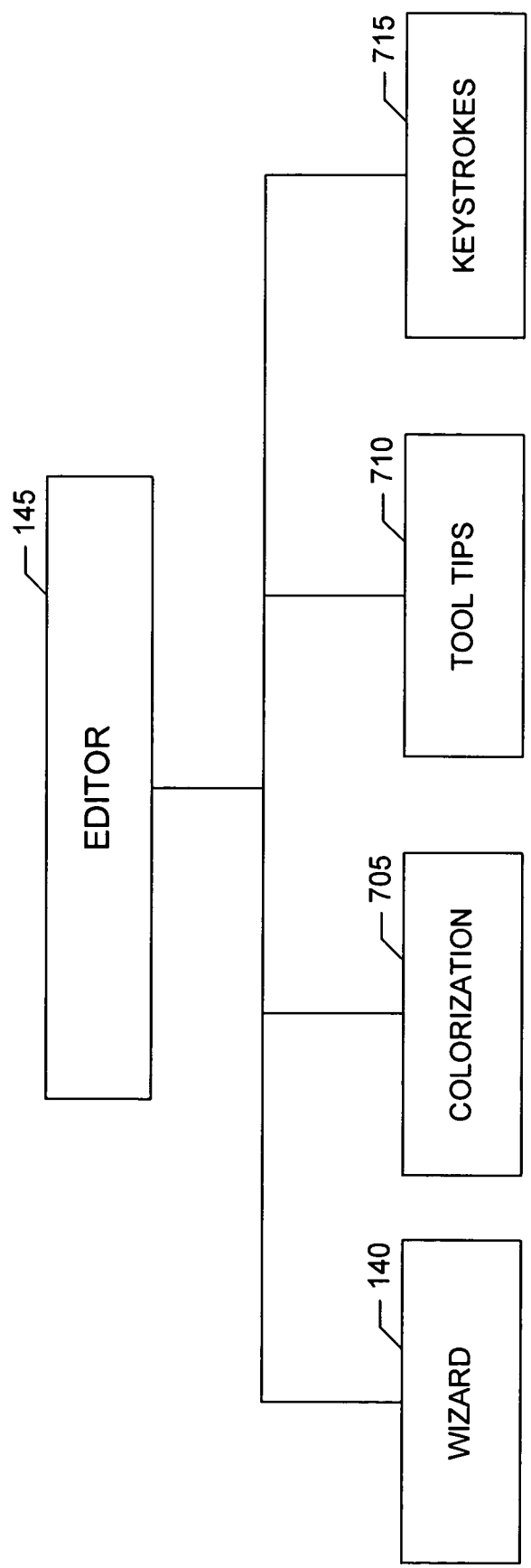
FIG. 7 is a block diagram representation of an editor of FIG. 1.

Preferably, there is a primary schema repository 120 that stores all schemas. Additionally, mirrored and/or local schema repositories can hold all or a subset of all schemas. It is also possible that several schema repositories exist that are not full mirrors of each other but that combined hold all schema. A block diagram of an exemplary schema repository 120 is depicted in FIG. 3. In the preferred embodiment, schemas in the schema repository 120 are located as a web resource at a URI corresponding to the value of the schema's namespace with a filename that is the same as the intended root element and namespace prefix. Thus, the schema repository 120 can be accessed via HTTP, for example, although it is also possible to access schemas in repositories using other protocols and in other directory structures.

The schema repository 120 is a directory structure that allows any schema corresponding to any given arbitrary namespace or arbitrary instance document (which would have a namespace within it) to be discoverable and available. A schema is considered available even if it is password protected for security, privacy or other practical reasons.

The schema can also be available in mirrored or local repositories. Also preferably, the schema repository 120 can be portable from the local or mirrored schema repositories. Local schema repositories can be created, but preferably the schemas downloaded in the local schema repository match exactly the schemas in the schema repository 120. If changes are made locally to a non-frozen schema, then the schema can be uploaded to the schema repository 120, and the old schema can be archived. If the schemas in the local schema repository does not match exactly the schemas in the schema repository 120, then the system may potentially encounter inoperability problems.

Mirrored schema repositories in either HTTP or FTP or other publicly accessible space can be created. Preferably, the mirrored schema repository follows the same directory structure as the schema repository 120 beginning with the directory "Schema". Also preferably, the mirrored schemas are exact replicas of corresponding schemas once a schema is frozen. If the schemas are not exact replicas, then the system 100 may potentially not work correctly because the system 100 preferably has distributed schema repositories. In the preferred embodiment, creating exact replicas of schemas in a mirrored repository can be done using digital signature technology, although other means are also within the scope of the present invention.

Optionally, the schema repository 120 can be password protected for access only by authorized users. Also, parts of the schema repository 120 can be password protected for access by different groups of users, while parts of the schema repository 120 can be open for semi-private or public consumption. Thus, "sub-repositories" can be created within the schema repository 120. Each of these sub-repositories can be password protected such that a select group of users is given access. Each sub-repository can also have its own SchemaDescriptions.XML file. When a user navigates to that part of the schema repository 120, the sub-repository would preferably have the same or similar look, feel, and functionality as the schema repository 120, but only those schemas in that part of the sub-repository would be available for searching and viewing. For example, the schema repository can have a first sub-repository 305A and a second sub-repository 305B. The first sub-repository 305A can have a security feature 310 that provides for password protection.

Also each sub-repository 305A and 305B can include a mailing list 315 and its own document repository 320. Both the mailing list 315 and the document repositories 320 can be used in a workgroup environment where multiple users, including users across organizations, can work on a set of schema and documentation at once.

Preferably, the schema repository 120 has a user interface 325 that allows the user to search the schema repository 120 and to view links to schemas in the repository. For example, the schema repository 120 can have a user interface 325 that lists the schema namespace prefix, or the "genre" of schema and its associated schema namespace as a web address. By clicking on the web address, the user can view 335 the schema. The list of schema can be in alphabetical order based on the namespace.

Also, there can be a search box/field that allows the user to search for a particular schema based on its namespace prefix or by elements, attributes, or types within schemas. For example, if the user searches the term "Email", all of the schema that have the string "Email" will appear in the browser, and the other schema will be sorted out. Letters or partial words can also be searched.

In the schema repository 120, the user can also view a description 340 of each schema. For example, if the user clicks on the schema prefix, the user can view a description of the schema. The schema description can provide an update history for the schema, including the name of the author and whether the schema, in its history, has been copied from another namespace. This historical record can be useful for understanding when and why changes were made to the schema and can provide a means to trace the schema back in time. The schema description can also be available either within the schema or in an accompanying documented schema.

The user can also view schema documentation 345 in the schema repository 120. For example, the schema namespace is a hypertext link that can take the user to either the schema documentation or to the schema itself, if documentation is not available. Schema documentation can include, but is not limited to, the schema namespace, the schema repository 120, the schema prefix, the elements, attributes, types, and imported schema in the schema, and the change history. Also within the schema documentation, there is preferably a "Schema Repository Location" link that takes the user to the schema file itself. There can also be a reference to a data dictionary and to a compressed (zip) file that includes all subschema of a complex, multi-level schema. Preferably, all schema documentation includes the same or substantially similar information in the same or substantially similar format, even though the schema documentation can include a variety of information in a variety of formats.

Preferably, the schema documentation begins with a table of contents. Also preferably, the items in the table of contents are hypertext links that, when clicked, take the user to a description of the element, simpleType, imported schema, or other construct used in the schema. Preferably, each definition has a link that can take the user back to the table of contents. The table of contents also includes a list of imported schema. Imported schema are external, not internal, and the schema themselves can contain elements, attributes, simpletypes, imported schema, and other constructs.

Through the user interface, the user can also download 350 schema packages and view 355 data dictionaries. The data dictionaries can be created from the schema and can provide a flat list of each term in a single schema or in a set of schema along with a link from the element, attribute, or simpleType name to the definition in the online schema documentation as well as the data type and a link to the definition of the data type. The schema packages can be compressed (e.g., zipped) files that preserve the hierarchical directory structure and include all schema that are in a set of schemas. Thus, the schema packages provide an easy way for a user to download the entire set of schema and unzip it into a local repository while preserving the directory structure.

The schema repository 120 can be periodically updated by using a crawler 360. The crawler 360 is a tool that allows an administrator to literally "crawl" the schema repository 120 and update the SchemaDescriptionXML files, which are used to generate the interfaces and provide the search capability described earlier in this section. For example, the crawler 360 can be a web-based tool.

The Schema Generator

Preferably, the schema generator 125 is an application that provides an interface 405 for creating, editing, and building normalized schema. To create 410 schema, the schema generator can preferably import 415 other schema or import 420 data dictionaries. Also preferably, the schema generator 125 can provide a user interface 420 that allows a user to manage schema, schema documentation and schema data dictionaries. Preferably, the schema generator 125 can do this by allowing a user to view schema 425; backup schema 430; copy schema and subschema 435; delete schema 440; document and annotate schema 445; and validate and normalize schema 450. Additionally, the user can create schema documentation 455; create data dictionaries 460; package schema and documentation 465; publish 470 schema, schema documentation, schema data dictionaries, and schema packages into a schema repository 120; and freeze schema 470.

To view schema, the user interface 405 can include a treeview and a schema properties window. In the treeview, there can be, for example, four tabs, "Repository," "Schema," "Imported Schema," and "Copy." Preferably, the schema properties window shows the properties of the last opened schema. In an exemplary embodiment, the Repository tab opens by default. On the Repository tab, the schema generator 125 can provide an interface into the local schema repository 120.

To open or view a schema 425, the user finds the schema in the schema repository 120 by preferably using the directory menu. Then, the user can select the schema file from the file menu. The user can open the schema in various applications, including but not limited to, the schema generator window, Internet Explorer, Notepad, or XML Spy.

Schema can also be documented 430 in the Repository tab. For example, a document button can be located on the Repository tab so that when the user clicks the button, the schema can be automatically documented. The user can add prose documentation to the schema either by editing the schema as a text file in another application, such as, for example, in Notepad or XML Spy, or the user can add prose documentation through the schema generator interface.

Also within the schema generator 125 is a feature to manipulate the schema 420. To validate and normalize schema 435, there can be two additional buttons: "Validate" and "Normalize." Clicking on the Validate button validates the schema by using, for example, Microsoft MSXML 4.0 parser. If the schema is not valid, the schema generator 125 can provide a message that states (a) that the schema is not valid with an error message from MSXML; (b) whether or not the schema is well-formed; (c) whether or not the schema namespace is a valid namespace; and (d) whether, based on the namespace, the schema is located in a correct place in the repository (if it is not located in a correct place, the schema may not import other schemas properly and may be invalid as a result, but otherwise be a good schema).

Clicking on the Normalize button will normalize the schema based on the schema framework's practices and conventions. Because the schema is altered during this processes and potentially changed, option boxes are preferably used to allow the user to the instruct the schema generator 125 whether or not to (a) back up the original schema; (b) over write the original schema; and/or (c) document the new schema with an update showing the schema has been normalized.

Also preferably, the schema generator 125 can include a function to automatically normalize schema by using a normalization algorithm. In the preferred embodiment, the algorithm functions such that an input schema is transformed into another representation and then transformed from that new representation into a schema. The resulting schema should be a valid schema, should follow the rules of the schema framework 115, and should validate the same instance documents as the original schema.

It is possible that the schema is a valid schema, such as a valid W3C schema, but not a normalized schema. In this case, the schema generator 125 attempts to fix the schema and put it into a normalized state. If the schema generator 125 cannot do this, it provides some explanation. The user has the option of normalizing the schema without saving it or normalizing the schema and saving it.

Schema can also be backed-up 440 in the schema generator 125. For example, a "Backup" button can exist on the Repository tab such that when the user clicks the Backup button, the schema is automatically backed-up in a file that preferably includes the date and time.

Because the schema are preferably "frozen" after an instance document based on the schema has been published, it is useful to be able to copy schema 445 or groups of schema from one place in the schema repository 120 to another place. Whether one schema or several schemas are copied, the schema generator 125 preferably copies the schema, changes the namespaces in the schema as well as any imported namespaces, and then saves the schema in its new location. The user can also specify where the copied schemas are to be stored. Groups of schemas can also be copied in substantially the same manner. Preferably, there is "Copy Single Button" and a "Copy All" button that the user can click to copy a schema and to copy all the schemas.

This ability to copy schemas is especially useful for forms and documents that change slightly from year-to-year or at other times. An exact replica of the form can be copied, and then slightly modified in its new namespace. Because the form of the original schemas are uniquely identified by their namespace and the schemas preferably remain "frozen" in their places in the schema repository 120, it is possible to validate legacy forms and documents created with the original schema, while upgrading to a new form.

A schema that is open in the schema generator 125 can be edited 450. Clicking on the Schema tab can bring up a sliding tab interface that shows elements, children, simpleTypes, and attributes. Elements, children, simpleTypes, and attributes can be added, edited, and/or deleted. As new schema are opened in the application, the schema generator 125 stores element names, attribute names, simpleType names, documentation (if available) and other information in a Dictionary. If the schema is an XML schema, the vocabulary is associated with a namespace, so that there is a history of where the term originated. Vocabulary from schemas that are not normalized schemas can also be imported into the Dictionary.

Most complex schema, such as messages, forms, and documents use many of the same "building block" schemas. It is often convenient to import "building blocks" or "primitives" from the schema repository 120 and use those schemas as they are or with slight revision. Similar to the Dictionary, the schema generator 125 has the ability to provide a pick list of existing schema and import user-selected schema directly from the schema repository 120 into a schema as it is being built. For example, if a form includes a "Witness", it is possible to (a) create an element named "Witness", (b) import the "Person" schema (which imports into it the Address, Email, and Phone schemas), and then (c) create the Witness type as "Person".

The pick list of schemas is created from a SchemaDescriptions.XML file generated by the crawler. Because the schema repository 120 can be segregated and password protected and can contain multiple SchemaDescription-.XML files, users of the schema generator 125 can be given limited access to parts of the schema repository 120 for security, privacy, or other reasons. Once schema have been generated, copied, edited, normalized, and documented, both the schema and documentation can be uploaded into the schema repository 120. This can be accomplished by clicking on the schema and the documentation in the Repository tab and clicking the Upload button.

Also within the user interface 405, the user can create schema documentation 455, create data dictionaries 460, package schema and documentation 465, publish schema 470, and freeze schema 475.

The Code Generator

Preferably, the code generator 130 has a user interface 505 which allows the user to generates code 510, generate a test project 515, and generate code documentation 520 from schema that, when compiled, provides a DOM-based (i.e., document object module based) application program interface ("API") to the schema. The code generator 130 generates code (or an API) that allows a programmer (or user) to easily output XML instance documents 525 that validate against the schema. The code-generated code can also consume valid XML instance documents and provide the data in the document to other applications from its API. Preferably, the API can save the XML instance document in the XML document repository 160 in a consistent manner.

The code-generated code can be source code 530 or compiled code 535, for example, and can be used in other applications, such as the editor, development kits, and applications created by third parties. The test project can use the code-generated code and has in itself generated code. The code generated code and the test projects output instance documents. Instance documents created by code-generated code (or the test project) can be stored in the document repository and used as input for the wizard, editor, viewer, and e-filing applications.

Preferably, the code generator 130 has a user interface 505 that is simple to use. For example, the user can select a normalized schema from the schema repository 120, can select an output location, and can select various properties, such as to generate only code or to generate source code or compiled code. Then, the user can click a button to generate code. The code generated is a set of classes that, when run or compiled, provide a very quick and easy way of creating XML instance documents that validate against the schema, as compared to manually creating such code, which would require substantial time. Thus, the resulting code can be used very easily within other code projects to output XML and consume XML instance documents, and to make data within the documents available through the API.

Preferably, the code generator 130 also creates a test project that uses the code-generated source code 530 or compiled code 535 that outputs an XML instance document with dummy data. The resulting test project can be used to output XML with little user intervention except mapping data values to the code-generated API and assuring the logic of the data is consistent with the rules of the schema.

Preferably, the code generator 130 can also send XML instance documents over the Internet or other network using one of several standard protocols, such as HTTP, FTP, SMTP, or SOAP.

The output XML instance document 525 can be compatible with the indexer and viewer 150 so that complex searches and reports can be generated from a repository of XML instance documents. The API allows a user to output "Simple XML" or "Complex XML." Both Simple XML and Complex XML preferably validates against the schema used to generate the code that generated the instance document. Specifying "Simple XML" preferably generates XML using locally declared namespaces and no namespace prefixes. Specifying "Complex XML" preferably generates XML using either globally or locally declared namespaces and uses namespace prefixes.

The Wizard

The wizard 140 is designed to allow users to quickly and simply enter data into a user interface 605 (that can be dynamically created by the wizard), create and edit XML messages and forms 610, create and edit templates 615, and submit completed messages and forms to electronic filing applications or other custom applications 620. Users of the wizard 140 need little or no knowledge of XML or other underlying technologies. Users simply type data into a user interfaces to create the XML message or form. When the form is completed, it is preferably saved in a document repository 160.

Preferably, the wizard 140 is simple to use, supports multiple forms and messages, supports submission of the forms and messages to electronic filing applications or other custom applications for processing of the XML data, and supports automatic storage of XML forms and messages in the document repository. Forms and messages can be created from any schema following the normalization rules of messages or forms. Forms that have stylesheets can be printed directly from the wizard 140. Forms can be viewed in html format, as for example in Internet Explorer or Netscape, in an Adobe PDF format, in a Rich Text Format ("RTF"), or in Scalable Vector Graphic ("SVG") format. Previously created documents can be opened, edited, and resent to electronic filing applications or other custom applications. Also, the wizard 140 can be configurable to automatically distribute completed forms to multiple HTTP, FTP, or SMTP addresses.

To reduce data entry into the forms, the user can create multiple templates 615 from within the wizard 140 to hold frequently used data; the user can use the internal copy button to copy and reuse information previously typed into the form into multiple other locations within the form; or the user can use the external copy button to copy and reuse information from outside data sources. Also, the wizard 140 can employ "perfect fit" technology to provide as much or as little space on the form for data of variable length.

The wizard 140 can work with both encrypted and unencrypted schema. Use of encrypted schema provides additional data security and integrity. The wizard 140 is also compatible with the viewer 150 for complex searches of the document repositories.

The wizard 140 provides users with a simple way to enter data into XML forms. "Perfect Fit" form technology provides as much or as little space as needed on the form for data of variable length. Perfect Fit technology works by combining the XML data and a stylesheet to dynamically create the visible form. Whether there is one address or five, all of the addresses will fit the space on the form. This is an improvement over paper forms and other electronic forms where a fixed space is provided for variable length data and blanks must be filled. For example, if a traditional form provides space for four data items, but the user types in only one of those data items, then there is extra space on the form for three items. Similarly, if the user has five items and there is only space for four, then the traditional form does not have enough room and the user either has to type in the form margin or some other free space, or the user has to add an addendum to the form.

Some forms can automatically be installed when the wizard 140 is installed. Other forms can be downloaded from the schema repository 120, or created by a user or an administrator using the schema generator 125 or another XML Schema development tool. Preferably, the system 100 is configured to allow only the administrator to add forms to the wizard 140, although it is within the scope of this invention to allow any user of the wizard 140 the ability to add and remove forms from the wizard 140.

When forms are added to the system, the user can select "Simple XML" or "Complex XML" as the "Output format." Both Simple XML and Complex XML can validate against the schema used to generate the wizard interfaces used for data entry. Specifying "Simple XML" preferably generates XML using locally declared namespaces and no namespace prefixes. Specifying "Complex XML" preferably generates XML using either globally or locally declared namespaces and will use namespace prefixes. The output location is a location in the document repository where the resulting XML instance document can be saved. The user can select any output location on any local or network drive for the document repository. Different forms can be saved in different document repositories, if desired.

Each form can be stored as a file in the document repository 160, and then subsequently accessed by a user or an application, by its unique form name, which preferably identifies the content of the form. For example, a form for a police complaint in New Hampshire can have the form name: "New Hampshire Police Complaint". Preferably, characters that are not permissible in filenames, such as colons or slashes, should not be used. Stylesheets can also be applied to a form. The use of a stylesheet is optional, but the stylesheet will enable the document to be viewed in a human readable format. The form can also be identified by opening it and determining its namespace.

In the wizard 140, the user can select either a new document or a new template. Preferably, a document is the default when the user first starts the application, and preferably, the application will remember the last selection each time the wizard 140 restarts.

In the document, the user can choose which form to open by selecting the form name from the list of available forms. Preferably, when "New Document" is selected, a form will open with a data entry screen on top. The data entry interface is generated dynamically from the schema. The form in the background is dynamically generated from the schema and the stylesheet. The wizard 140 can dynamically generate new interfaces based on an arbitrary XML schema, provided the schema is normalized based on the rules of the schema framework.

The wizard 140 understands the form based on the namespace of the XML schema selected in the configuration. Schemas imported are understood as well, as their namespaces will be present when imported. The wizard configuration file allows the administrator to select a schema and a stylesheet and a form name for the form. The form name appears in the new document window. In the background, the form is uniquely identified by its namespace. As a result, the wizard 140 can automatically generate interfaces appropriate to the form based on the XML schema. Likewise, the stylesheet is created especially for data created by the XML schema, ensuring that it will work properly to render the data input and resulting XML.

Completed or partially completed forms can also be opened in the wizard 140. Alternatively, forms can be opened directly from the document repository or from within the viewer. When opened, data in a saved form automatically populates the data entry screens where the data can be edited or augmented. Because the XML document's namespace is preferably present in the XML document when it is saved, the wizard 140 can read the namespace and locate the appropriate schema in the schema repository 120. However, if the namespace is not present in the XML document (or if the namespace is incorrect or if the schema at the end of the namespaces has changed), then the wizard 140 may not work properly and the system 100 can fail. Thus, the wizard 140 can generate interfaces appropriate to the XML form and can populate the XML data automatically into the interfaces.

Preferably, schema included in the wizard installation files are encrypted and packaged so that they cannot be easily altered. Thus, schema that are distributed are "frozen" from a technical perspective so they are more difficult to alter.

The user interface for each form can differ depending on the schema and stylesheet used. The wizard 140 can use multiple screens and sub-screens to navigate through the data entry process. These screens correspond to the hierarchy of the XML schema. The user is able to type in as little or as much data as is necessary, as defined by the schema, for a particular form. The user can enter data into a field by typing directly into that field. Some fields, for example "Create Date" or "Create Time," open a new pop up box where the user can enter data specific to that field. There are a number of XML schema constructs that the wizard 140 recognizes to create special controls in the interface. For example, combo boxes, or drop down lists, can be created based on specific schema constructs.

In the preferred embodiment, common controls (for the specific platform, programming language, or operating system, such as but not limited to, Windows, Linux, and Java) can be created based on the data type or construct in the schema. For example, simpleTypes with enumerations can create drop down boxes with lists. Strings (xsd:string) or integers (xsd:integer) with maxLength and minLength can create a text box that allows specified length in characters. A simpleType named "Memo" can create a large, multi-line text box. Special constructs can exist for font picker controls, radio buttons, check boxes, date and time pickers, and other controls.

The labels in the wizard 140 interface are preferably dynamically generated from element and attribute names. Preferably, element and attribute names use no spaces. As a result, the wizard 140 searches for combinations of lower case and uppercase letters (e.g., "tN" in "FirstName") and adds a space in between the lower case and upper case letter to create a dynamically generated label. Other ways of generating labels for interfaces based on the schema are also within the scope of the present invention Thus, users can create any arbitrary schema, using for example the schema generator 125 and have the schema and its vocabulary appear in and create data entry screens in the wizard 140. For example, the wizard 140 can automatically generate foreign language interfaces simply by using schema that use foreign words for element and attribute names.

Within the user interface, the user can navigate through the fields by using the mouse or the tab key and keystrokes, for example. "Previous" and "Next" buttons can be used to move between screens. Also, the user can navigate through main screens and sub-screens. Sub-screens are screens within screens. The relationship among screens reflects the Parent/Child/Sibling relationships as defined by the XML schema. As a result, it can be said that there are parent screens, children screens, which are screens on different levels, and sibling screens, which are screens on the same level. Parent screens may have multiple children screens. A child screen may itself be a parent screen and may have children.

"Choice screens" can be used to enable the user to choose an item from among a discrete number of items defined by the schema. For example, radio buttons can be used to allow the user to make a choice among the items. Once the user chooses an item, then the user can input data. Once the user presses a Done button, the text beside the radio button previously chosen will preferably change to reflect that data has been inputted.

The "Done" button can be used to save the data entered on the screen or sub-screen. If the user is in a sub-screen, the done button will preferably return the user to a main screen or parent screen.

A "Cancel" button can be used to discard all new data entry for that particular screen and close the screen. If the user is working on a sub-screen (e.g., a child screen) and presses cancel, the data entered on that screen will preferably be cleared and the user will return to the screen's parent screen. If the user presses cancel on a main screen, the entire form preferably will be closed and all previously entered data will be discarded. Also preferably, if the user is editing data previously typed, the cancel button will not discard the data previously typed, but new data will not be saved.

A "Finish" button can be used to save all of the data entered as an XML file in the document repository. The location of the document repository is set in the wizard configuration. The Finish button also shows the user a finished version of the form the user has just completed. Additionally, the Finish button can be configured to email the form as an attachment to the email addresses in the configuration and/or to call an external application, such as an electronic filing application, that can receive and process the form.

An "EFiling" button can be used to electronically file the form through the e-file module. Other buttons can be added to the user interface. The other buttons can include, for example, copy, delete, save, print preview, print, email, new form, all of which are generally known in the art. Also, arrow buttons can be used to add additional data in a field. Additionally, buttons can be defined within the wizard 140. For example, one button can be labeled "Create Complaint", such that when it is clicked, a screen pops up for data entry. Alternately, a complaint form can appear in the user interface.

The user of the wizard 140 can create and store various templates within the wizard 140. Templates can be useful when the user wishes to store frequently used data in a form, so the user does not have to type the same information repeatedly. For example, if the user has a form where the user always uses the user's address as the return address, then the user could create a template with the user's address stored in it. The template can then be available to the user when the user creates a new document, which saves the user from typing in the address repeatedly. Thus, it can be much quicker to create and use templates for common data. Combined with the copy button, duplicate data entry is reduced or eliminated, and the quality of data is high because mistakes are avoided when retyping is avoided.

The wizard can receive as input an XML form or message created by code-generated code. For example, a developer can use the API from code-generated code to put information from a backend database into an XML instance document based on a schema. The XML instance document created from the code-generated code can then be opened in the wizard and edited as if the XML instance document were created in the wizard.

The Editor

The editor 145 is a word processor that can be used for editing the documents defined by the schema framework 115. Even a user unfamiliar with XML and the underlying technology can quickly and easily operate the editor 145. Preferably, the editor 145 automatically configures itself based on the document type opened. Also preferably, the editor 145 uses the wizard 140 internally to allow the user to edit data inside the document without seeing the XML tags within the document. The editor 145 has an authoring interface 705 that preferably uses "colorization" 710, "tool tips" 715, and "keystrokes" 720 to show the author visually where data elements and document parts are located within the document, rather than including tags within the text. This provides a what-you-see-is-what-you-get ("WYSIWIG") XML authoring environment. Additionally, the user can insert new vocabulary into the XML document. Moreover, the editor 145 is preferably compatible with the wizard 140 and can be used in frontmatter, backmatter, and within paragraphs, outlines, tables, and headings in the body. The editor can include an electronic filing button that passes documents to an electronic filing application.

Upon launching the editor 145, the user can create a new document, edit a document, or create a document from a template. For example, the user can search the document repository and open a document for editing. Preferably, the user interface of the editor 145 has the look and feel of standard word processing software.

However, unlike traditional word processing software, the top and bottom portions of the document (i.e., frontmatter and backmatter) are preferably static forms. For example, if a user is typing information into the document frontmatter, and the user types the enter key or the spacebar key within a vocabulary item, the wizard tool will pop up and provide the user an interface in which to type the information. Thus, unlike other word processing software, the enter key does not produce a line feed within frontmatter, backmatter, or a vocabulary item. However, when the user edits prose that is not vocabulary within paragraphs, outlines, and tables within the body of the document and types the enter key, a line feed is created.

For example, document formats such as MS Word and Word Perfect create a completely free-flowing document format where line feeds are inserted whenever the enter key is used, creating a very flexible authoring environment with no fixed content. Document formats such as Adobe Portable Document Format (PDF) are very static, rigid formats that allow a user to type data into blanks, but do not allow the free-form editing environment of a word processor. The editor uses a document format (defined by the schema framework) that tells the application that some parts of the document are fixed and not appropriate for line feeds, while other parts of the document are not fixed and are appropriate for free-form editing such as editing in a word processor.

Preferably, the top and bottom of the document are authored much like a document in the wizard 140 except that in addition to the wizard interface, it is possible to type directly into the document, which is similar to using a word processor or typing into a fill-in-the-blank electronic form.

To enter data into the vocabulary in the document, the user can type into the interface, which is similar to using a word process or typing into a fill-in-the-blank electronic form, or the user places the cursor into a vocabulary field and clicks the enter key or the spacebar key. When the user does this, the wizard 140 launches. The user can also right click on the mouse to insert new vocabulary or edit existing vocabulary with the wizard 140. Once the wizard 140 opens, the user can then type in information to fill the vocabulary. Some vocabulary items, for example "Name of Child" or "Address", can open a pop up box where the user can enter data specific to that field. Other items, such as "Date" fields, can open a pop up box that allows the user to choose a date using a date picker control. Also, it should be noted that some vocabulary items can be edited, while other vocabulary items can remain unedited.

Alternately, the user can select a vocabulary field with the mouse (for example, by left clicking the field) and then can type directly into the field. The vocabulary placeholder (e.g. "[Enter Name of Child]") preferably disappears, and the text the user types appears in its place.

Preferably, when the user moves the mouse over the text, or when the cursor is otherwise placed in the text, the area where the user can enter text changes color, which is a technique known as colorization 710. As the user moves the mouse over vocabulary, different colors indicate where pieces or chunks of vocabulary, clauses, and paragraphs exist in the document. In addition, a tool tip 715 can appear over the vocabulary, clause, or paragraph, which conveys to the user the information is within the document.

The user can also use the arrow keys to move between the different fields, vocabulary, clauses, and paragraphs ("nodes"). In the preferred embodiment, keystrokes 720 are used in the user interface to move between the different nodes. For example, if the cursor is in front of the last character at the end of the first node, and the user clicks the right arrow key, the cursor will move one character to the end of the first node, adjacent to the second node. The first node will remain colored. When the user clicks the right arrow key again, the first node will loose color and the second node will become colored, although the cursor will not move in the user interface. The color signifies to the user that the content in the first node is no longer editable but that the content in the second node is editable. If the user clicks the right arrow key a third time, then the cursor will move one character to the right. Thus, two keystrokes of the arrow keys allow the user to visually move between adjacent nodes (e.g., three right arrow key strokes result in only two movements of the cursor when the cursor is at the boundary of a node). This behavior is unlike other word processors. Combined with colorization, this behavior enables the editor's WYSIWYG feature, because unlike other word processors, viewable markers are not required within the editable document.

When the user left clicks on a vocabulary place holder, for example "[Type County]", and then types the text, the vocabulary placeholder disappears. Vocabulary placeholders preferably use [brackets] and the word "Type" to indicate a blank vocabulary item within the document, which can be edited, although other textual cues could be used. Once the user has entered information into the vocabulary item, the placeholder disappears. If the user deletes all of the text in a vocabulary item, by using the delete or backspace key, the vocabulary place holder preferably reappears.

If the user has selected a vocabulary date field (i.e. "[Type Date]") within a heading, paragraph, or outline, a date wizard can be used to enter the date. The date wizard can provide drop down lists of the day, month, and year, and then automatically create a date field in the XML document.

Similar to the wizard 140 discussed herein, the editor 145 can also have a plurality of buttons, including, but not limited to, next, previous, cancel, done, and finish, to move between screens and to save, cancel, or manipulate data therein.

Also within the editor 145, the user can open, for example, a notepad application. The notepad has the look and feel of standard word processing software, with various editing tools, toolbars, and pop-up menus from the right click of the mouse. Within the notepad, the user can create a new XML document. Within the document, the user can enter paragraph text by, for example, clicking on the "[Type paragraph]" field on the screen, and typing into it. Also, the user can select a feature to convert the paragraphs typed into an outline format. An outline is an indented and numbered area of text (similar to bulleted lists in a word processor). Outlines can also be created directly within notepad.

In addition to adding paragraph text, the user can add headings to the paragraphs. The user can select the heading option from the toolbar or the pop-up menu from the right click of the mouse to generate a new heading. Headings can be automatically numbered within the XML document.

The editor 145 has the ability to add and save "most used clauses" that can be automatically inserted into the XML document, including into the paragraphs, headings, and outlines. Thus, creating documents is quick and easy and reduces the number of errors by minimizing the data entry involved in re-keying. For example, a pop-up window or a menu can be used to store the "most used clauses" that can later be accessed by the user by opening the window or menu.

The editor can configure itself to any document that follows the rules of the schema framework 115. Preferably, buttons will appear on a left-aligned toolbar that correspond to structural elements in the body of the document. For example, in a transcript, if question and answer structural elements are defined by the schema in a document's body, then buttons that allow the user to insert a question and answer will preferably appear on the left-aligned toolbar. Likewise, in a contract, if a clause structural element is defined by the schema, then a button that allows the user to insert a clause will preferably appear on the left-aligned toolbar.

The Document Repository

Preferably, the document repository 160 is a directory structure that can store the various documents and forms. Also preferably, the document repository 160 can be indexed and searched by the indexer and viewer 150. Preferably, the directory structure is set of hierarchical directories and subdirectories that are organized by a main directory determined by a user, with the first level of subdirectories named based on the year in which an XML instance document is created, such as "2003" or "2004"; the second level of subdirectories named based on the numerical month in which the XML instance document is created, such as "01" for January or "02" for February; and the third level of subdirectories named based on the day in which the XML instance document is created. For example, an instance document created on March $7^{th}$, 2004, can be saved in a directory such as "MainDirectory/2004/03/03/."

The Viewer and Indexer

The viewer and indexer 150 can search the document repository 160 based on any of a variety of search parameters. The viewer and indexer 150 can search any field of each document in the document repository 160. Also preferably, the viewer and indexer 150 can automatically configure itself based on the rules of the schema framework. For example, the viewer and indexer 150 can automatically configure itself based on an input schema to create a search term or a plurality of search terms that can be used to search the document repository 160 (and/or mirrored and local repositories) containing documents and forms created based on the same input schema. If used with the e-filing module 155, electronic filings and confirmations are also saved in the document repository 160 and are easily and fully searchable using the viewer 150.

The E-Filing Module

The e-filing module allows the user of the system 100 to electronically file the form or document with an electronic filing service provider. The module allows the user to send one or more documents to one or more recipients in a manner similar to using electronic mail.

While the invention has been shown and described in preferred forms, it will be apparent to those skilled in the art that many modifications, additions, and deletions can be made therein. These and other changes can be made without departing from the spirit and scope of the invention as set forth in the following claims.

What is claimed is:

1. A mark up language schema stored in a directory tree memory structure, the mark up language schema having a mark up language schema namespace associated therewith, the mark up language schema namespace including a category identifier that identifies a category to which the mark up language schema relates, and wherein the category identifier provides information about where the mark up language schema associated with the mark up language schema namespace is stored in the directory tree memory structure, wherein the mark up language schema namespace is constructed based on a predefined set of rules of construction and is normalized to determine whether the mark up language schema namespace complies with the predefined set of rules of construction.

2. The mark up language schema of claim 1, wherein the category identifier identifies a genre to which the schema associated with the mark up language schema namespace relates.

3. The mark up language schema of claim 1, wherein the category identifier identifies a geographical location.

4. The mark up language schema of claim 1, wherein the category identifier identifies a genre to which the mark up language schema associated with the mark up language schema namespace relates and a geographical location.

5. The mark up language schema of claim 4, wherein the category identifier identifies at least a legal jurisdiction.

6. The mark up language schema of claim 4, wherein the category identifier identifies at least an organization.

7. The mark up language schema of claim 4, wherein the category identifier identifies at least a type of document or form.

8. The mark up language schema of claim 4, wherein the category identifier identifies at least a person.

9. The mark up language schema of claim 4, wherein the category identifier identifies at least an address.

10. The mark up language schema of claim 1, wherein if an instance document associated with the mark up language schema's namespace is published, the category identifier used as the mark up language schema namespace and the associated mark up language schema will be frozen.

11. The mark up language schema of claim 1, wherein the mark up language schema namespace further includes a content type identifier that identifies a type of content associated with the mark up language schema.

12. The mark up language schema of claim 1, wherein the mark up language schema namespace further includes a version identifier that identifies a version to which the mark up language schema corresponds.

13. The mark up language schema of claim 1, wherein the mark up language schema namespace further includes a uniform resource identifier (URI) that identifies a web resource associated with the mark up language schema.

14. The mark up language schema of claim 1, wherein the markup language schema namespace is unique within a schema framework and identifies a unique schema within the schema framework.

* * * * *